US010504631B2

(12) United States Patent
Mashio et al.

(10) Patent No.: US 10,504,631 B2
(45) Date of Patent: Dec. 10, 2019

(54) PLANT ABNORMALITY PREDICTION DETECTION SYSTEM

(71) Applicant: MITSUBISHI HEAVY INDUSTRIES, LTD., Tokyo (JP)

(72) Inventors: Kenji Mashio, Tokyo (JP); Takae Yamashita, Tokyo (JP); Takashi Azuma, Tokyo (JP); Susumu Shiizuka, Tokyo (JP); Junichi Nishitani, Tokyo (JP); Masafumi Utsumi, Tokyo (JP); Jun Shibuya, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 15/579,715

(22) PCT Filed: Jun. 22, 2016

(86) PCT No.: PCT/JP2016/068558
§ 371 (c)(1),
(2) Date: Dec. 5, 2017

(87) PCT Pub. No.: WO2017/051574
PCT Pub. Date: Mar. 30, 2017

(65) Prior Publication Data
US 2018/0182503 A1    Jun. 28, 2018

(30) Foreign Application Priority Data
Sep. 25, 2015  (JP) ................. 2015-188599

(51) Int. Cl.
*G21D 3/04* (2006.01)
*G05B 23/02* (2006.01)
*G21C 17/00* (2006.01)

(52) U.S. Cl.
CPC .............. *G21D 3/04* (2013.01); *G05B 23/02* (2013.01); *G05B 23/0235* (2013.01); *G21C 17/00* (2013.01)

(58) Field of Classification Search
CPC ...... G21D 3/04; G05B 23/02; G05B 23/0235; G21C 17/00
See application file for complete search history.

(56) References Cited

U.S. PATENT DOCUMENTS 4,263,654 A * 4/1981 Fukuzaki ................. G21D 3/10
376/216
5,623,109 A * 4/1997 Uchida .............. G05B 23/0254
73/865.9
2008/0071501 A1  3/2008 Herzog

FOREIGN PATENT DOCUMENTS

EP    0 626 697 A1    11/1994
EP    1 630 635 A2    3/2006
(Continued)

OTHER PUBLICATIONS

International Search Report dated Aug. 16, 2016, issued in counterpart International Application No. PCT/JP2016/068558, with English translation (6 pages).
(Continued)

*Primary Examiner* — Lily C Garner
(74) *Attorney, Agent, or Firm* — Westerman, Hattori, Daniels & Adrian, LLP

(57) ABSTRACT

A plant abnormality predict detection system for detectably monitoring an indication of abnormality in an atomic power generation plant is provided with: a data storage unit which stores plant operation data including an instrument parameter measured in the atomic power generation plant; and a monitoring and control unit which, on the basis of the plant operation data, detects an indication of abnormality in the atomic power generation plant, wherein the atomic power generation plant performs a base-load operation so that the instrument parameter has a prescribed target value, and wherein the monitoring and control unit, on the basis of past plant operation data, sets a normal range W that is a range in which the instrument parameter at the current time transitions normally, and detects an indication of abnormality when the instrument parameter at the current time exceeds the normal range W that has been set.

4 Claims, 3 Drawing Sheets

(56) References Cited

FOREIGN PATENT DOCUMENTS

| | | | |
|---|---|---|---|
| JP | 3-220498 | A | 9/1991 |
| JP | 4-164295 | A | 6/1992 |
| JP | 6-309585 | A | 11/1994 |
| JP | 2001-175972 | A | 6/2001 |
| JP | 2004-240905 | | 8/2004 |
| JP | 4434795 | B2 | 3/2010 |
| WO | 02/41091 | A1 | 5/2002 |

OTHER PUBLICATIONS

Written Opinion dated Aug. 16, 2016, issued in counterpart Application No. PCT/JP2016/068558, with English Translation. (7 pages).
Extended (Supplementary) European Search Report dated Aug. 16, 2018, cited in counterpart application No. 16848364.2. (7 pages).
Office Action dated Apr. 18, 2019, issued in counterpart EP application No. 16848364.2. (5 pages).
Office Action dated Aug. 6, 2019, issued in counterpart JP Application No. 2015-188599, with English translation (8 pages).

\* cited by examiner

PLANT ABNORMALITY PREDICTION DETECTION SYSTEM

TECHNICAL FIELD

The present invention relates to a plant abnormality predict detection systems which detects an abnormality, predict in a nuclear power plant.

BACKGROUND ART

In the related art, there is an operation data management device monitoring a monitoring target such as a plant (for example, refer to PTL 1). The operation data management device compares management values for determining a state with operation data acquired from a monitoring target so as to evaluate whether or not there is abnormality, and the extent of abnormality, and monitors the acquired operation data in a case where it is determined that there is abnormality. Specifically, the management values are set to three values such as an upper/lower limit value, an alarm threshold, and a stoppage value so that a state region of operation data is divided into four regions such as a normal region, a preliminary warning region, a warning region, and a stoppage region. The management values are boundary values for dividing the region.

CITATION LIST

Patent Literature

[PTL 1]Japanese Patent No. 4434795

SUMMARY OF INVENTION

Technical Problem

Meanwhile, operation data acquired from a monitoring target such as a plant may greatly change depending on an operation situation of the plant. In this case, there is a probability that the operation data may change over the normal region and the preliminary warning region, and, thus, for example, even if the plant is normal, the operation data may transition to the preliminary warning region, or even if the plant shows an abnormality predict, the operation data may transition to the normal region. Thus, in the operation data management device disclosed in PTL 1, it is hard to detect an abnormality predict in a case where operation data transitions in the normal region. Here, the detection of an abnormality predict indicates that a plant facility does not reach abnormality due to deterioration or the like over time of the plant facility, but an indication of a high probability of abnormality in the future is detected.

Here, as a method of detecting an abnormality predict, there is a method in which an abnormality predict is detected on the basis of a correlation of operation data of a plant. Specifically, a plurality of pieces of operation data which can be acquired from the plant are combined with each other, and, in a case where a correlation value of the combined pieces of operation data is deviated relative to a correlation value during normal times, an abnormality predict is detected. However, in the method of detecting an abnormality predict, a combination with a low correlation may be generated due to the influence of noise, and, as the number of pieces of operation data increases, the number of combinations increases, and thus there is a problem in that a computation load regarding an abnormality predict increases.

Therefore, an object of the present invention is to provide a plant abnormality predict detection system which can prevent an increase in a computation load and also appropriately detect an abnormality predict, by taking into consideration that a nuclear power plant performs a base-load operation.

Solution to Problem

According to the present invention, there is provided a plant abnormality predict detection system for detectably monitoring an abnormality predict in a nuclear power plant, including a data storage unit that stores plant operation data including an instrument parameter measured in the nuclear power plant; and a monitoring control unit that detects an abnormality predict in the nuclear power plant on the basis of the plant operation data, in which the nuclear power plant performs a base-load operation so that the instrument parameter has a predefined target value, and in which the monitoring control unit sets a normal range which is a range in which the instrument parameter at the current time transitions normally on the basis of the past plant operation data, and detects an abnormality predict, in a case where the instrument parameter at the current time exceeds the set normal range.

According to this configuration, the nuclear power plant performs a base-load operation, and thus an instrument parameter which is measured transitions toward a target value. Thus, an instrument parameter included in the past and present plant operation data performs the substantially same transition in a case where operation situations of the nuclear power plant are the same as each other, and the nuclear power plant is in a normal state. Therefore, the monitoring control unit can appropriately detect an abnormality predict in a case where the present instrument parameter exceeds the normal range which is set on the basis of the past plant operation data. In this case, since the monitoring control unit has only to determine whether or not the present instrument parameter exceeds the normal range without being required to obtain a correlation between instrument parameters, it is possible to prevent an increase in a computation load.

Preferably, an alarm threshold for a warning of abnormality in the nuclear power plant is set in advance, the alarm threshold is a threshold value for dividing a region of the instrument parameter into a normality determination range in which the instrument parameter is normal and an abnormality determination range in which the instrument parameter is abnormal, and the normal range is set in the normality determination range.

According to this configuration, since the normal range is set in the normality determination range, it is possible to detect an abnormality predict of the nuclear power plant in the normality determination range in which an instrument parameter is not abnormal.

Preferably, a plurality of operation modes corresponding to operation situations of the nuclear power plant are prepared in advance, the normal range is prepared in a plurality on the basis of the plant operation data in the past operation situations corresponding to the plurality of operation modes, and, if the operation mode corresponding to the present operation situation of the nuclear power plant is set, the monitoring control unit preferably sets the normal range corresponding to the operation mode.

According to this configuration, it is possible to set an appropriate normal range according to an operation situation of the nuclear power plant. Therefore, it is possible to detect an abnormality predict corresponding to an operation situation of the nuclear power plant. Here, a plurality of operation situations of the nuclear power plant, that is, a plurality of operation modes are prepared according to, for example, operation situations of the nuclear power plant which change depending on external environments, or according to operations of the nuclear power plant, such as an activation operation and a stoppage operation.

Preferably, the monitoring control unit can change a width of the set normal range.

According to this configuration, the sensitivity of detection of an abnormality predict can be lowered by increasing a width of the normal range, and the sensitivity of detection of an abnormality predict can be heightened by reducing the width of the normal range. Therefore, for example, the set normal range is changed to be reduced toward the late period of an operation cycle of the nuclear power plant, and thus the sensitivity of detection of an abnormality predict can be heightened in the late period of the operation cycle.

DESCRIPTION OF EMBODIMENTS

Hereinafter, an embodiment of the present invention will be described in detail with reference to the drawings. The invention is not limited to the embodiment. Constituent elements in the following embodiment include constituent elements which can be easily replaced by a person skilled in the art, or the substantially same constituent elements. Constituent elements described below may be combined with each other as appropriate, and, in a case where there are a plurality of embodiments, the embodiments may be combined with each other.

Embodiment

Figure 1:
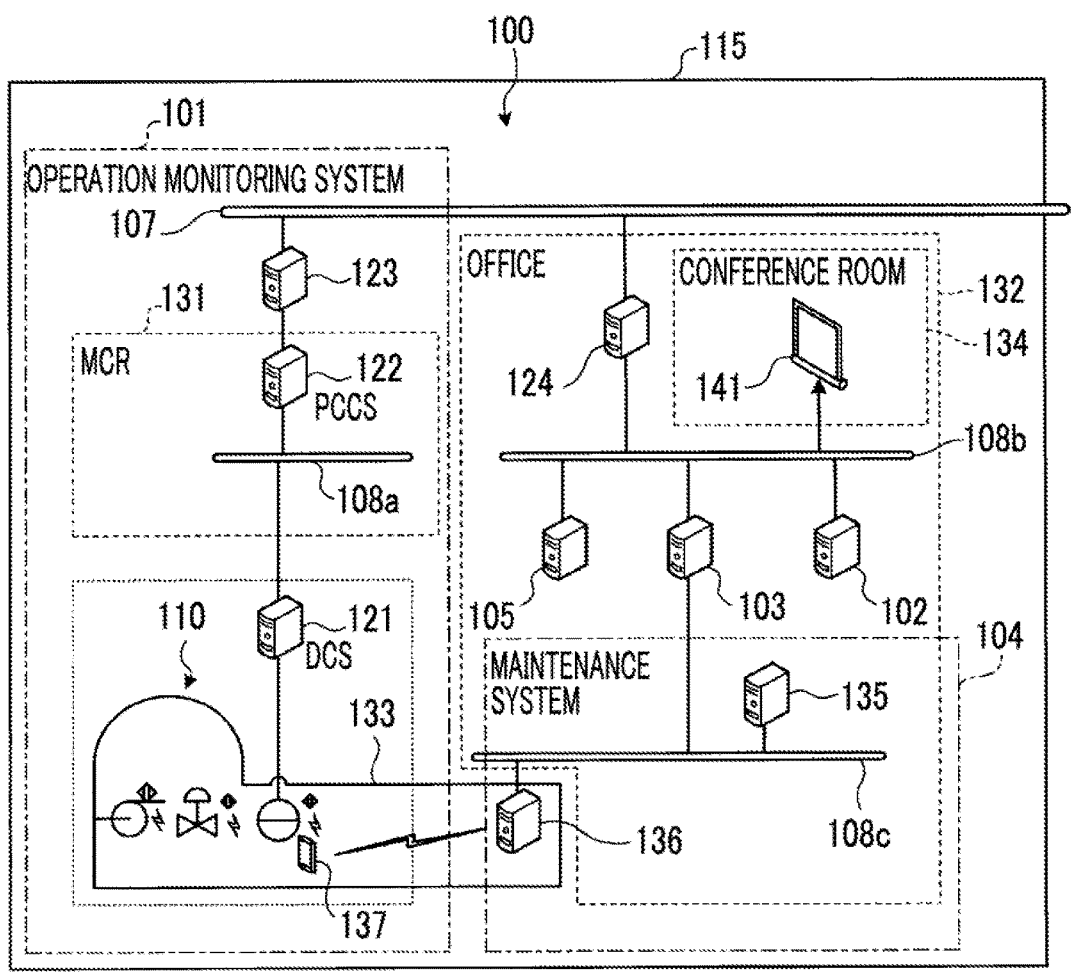
FIG. 1 is a schematic configuration diagram illustrating a nuclear power plant system including a plant abnormality predict detection system according to the present embodiment.

FIG. 1 is a schematic configuration diagram illustrating a nuclear power plant system including a plant abnormality predict detection system according to the present embodiment. As illustrated in FIG. 1, a plant abnormality predict detection system 102 according to the present embodiment is incorporated into a nuclear power-plant system 100 used to operate a nuclear power plant. Here, the nuclear power plant is, for example, a nuclear power generation plant 110 having a reactor, and the nuclear power generation plant 110 is controlled to perform a base-load operation, and is provided in a site 115. First, with reference to FIG. 1, prior to a description of the plant abnormality predict detection system 102, the nuclear power plant system 100 will be described.

As illustrated in FIG. 1, the nuclear power plant system 100 includes an operation monitoring system 101, the plant abnormality predict detection system 102, an abnormality diagnosis system 103, a plant maintenance system 104, and an plant operation historian database 105. In the nuclear power plant system 100, the respective systems 101, 102, 103 and 104 and the plant operation historian database 105 are communicably connected to each other via a station bus 107 and a plurality of unit buses 103a, 108b and 108c.

The operation monitoring system 101 monitors and controls an operation of the nuclear power generation plant 110. The operation monitoring system 101 includes a distributed control system (DCS) 121, a process control computer system (PCCS) 122, and a gateway 123.

The distributed control system 121 is controllably connected to the nuclear power generation plant 110, and is configured to include a plurality of control devices to which a plurality of control functions are distributed. The distributed control system 121 is a system controlling operations of respective equipment such as pumps and valves (not illustrated) provided in the nuclear power generation plant 110. The distributed control system 121 controls an operation of the nuclear power generation plant 110 by controlling operations of the respective equipment on the basis of a control signal from the process control computer system 122. The distributed control system 121 is connected to a plurality of measurement equipment provided in the nuclear power generation plant 110, acquires a plurality of instrument parameters which are respectively output from the plurality of measurement equipment as plant operation data, and outputs the acquired plant operation data to the process control computer system 122.

The process control computer system 122 is connected to the distributed control system 121 via the unit bus 108a, and is provided in a main control room (MCR) 131 separated from a building 133 in which the nuclear power generation plant 110 is provided. The process control computer system 122 acquires the plant operation data which is input from the distributed control system 121, and also outputs a control signal for controlling an operation of the nuclear power generation plant 110 to the distributed control system 121. The process control computer system 122 outputs the plant operation data acquired from the distributed control system 121, to the plant operation historian database 105 via the gateway 123 and the station bus 107.

The gateway 123 is provided between the process control computer system 122 and the station bus 107, and is thus connected to the process control computer system 122 and the station bus 107. The gateway 123 permits the plant operation data to be output from the process control computer system 122, and also restricts data from other systems from being input to the process control computer system 122.

The operation monitoring system 101 acquires plant operation data from the nuclear power generation plant 110, and monitors the acquired plant operation data. The operation monitoring system 101 causes the nuclear power generation plant 110 to perform a base-load operation so that a plurality of an instrument parameter included in the acquired plant operation data reach predefined target values. As mentioned above, the nuclear power generation plant 110 performs a base-load operation so that a target value reaches a steady-state value.

The plant operation historian database 105 is connected to the station bus 107 via the unit bus 108b and a gateway 124. In other words, the gateway 124 is provided between the unit bus 108b and the station bus 107 so as to be connected to the unit bus 108b and the station bus 107, and the plant operation historian database 105 is connected to the unit bus 108b. The plant operation historian database 105 is provided in an office 132 separated from the building 133 in which the nuclear power generation plant 110 is provided. The plant operation historian database 105 accumulates plant operation data output from the distributed control system 121 so as to preserve the history of the plant operation data. The plant operation historian database 105 can output plant operation data in response to requests from the abnormality diagnosis system 103 and the plant maintenance system 104.

The plant abnormality predict detection system 102 is connected to the unit bus 108b, and can thus acquire plant operation data output from the plant operation historian database 105, via the unit bus 108b. The plant abnormality predict detection system 102 can acquire plant operation data output from the distributed control system 121 in real time. As will be described later in detail, the plant abnormality predict detection system 102 compares a normal range which is set on the basis of the past plant operation data preserved in the plant operation historian database 105 with the present plant operation data acquired in real time, and thus detects an abnormality predict of the nuclear power generation plant 110. The plant abnormality predict detection system 102 is connected to the unit bus 108b, and can thus output plant abnormality symptom indication data which is data regarding the detected abnormality predict to the abnormality diagnosis system 103.

The abnormality diagnosis system 103 is connected to the unit bus 108b, and can thus acquire plant abnormality symptom indication data output from the plant abnormality predict detection system 102, via the unit bus 108b. The abnormality diagnosis system 103 specifies a facility or a machine causing abnormality among various facilities and various equipment forming the nuclear power generation plant 110 on the basis of the plant abnormality symptom indication data. The abnormality diagnosis system 103 is connected to the unit bus 108c, and can thus output a diagnosis result regarding the specified facility or machine to the plant maintenance system 104 as maintenance data.

The plant maintenance system 104 is a system for maintenance of the nuclear power generation plant 110. The plant maintenance system 104 acquires the maintenance data of the nuclear power generation plant 110 diagnosed by the abnormality diagnosis system 103, and provides the acquired maintenance data to a maintenance worker, or acquires and accumulates maintenance inspection results obtained due to inspection work or the like performed by the maintenance worker as maintenance data. The plant maintenance system 104 includes a maintenance database 135, a maintenance management terminal 136, and a maintenance management portable device 137.

The maintenance database 135 is provided in the office 132, and is connected to the unit bus 108c. The maintenance database 135 outputs maintenance data to the abnormality diagnosis system 103, accumulates maintenance data which is input from the maintenance management terminal 136 and the maintenance management portable device 137, and outputs the maintenance data acquired from the abnormality diagnosis system 103 to the maintenance management terminal 136.

The maintenance management terminal 136 is provided in the building 133 in which the nuclear power generation plant 110 is provided and which is a non-management zone, and is connected to the unit bus 108c. The maintenance management terminal 136 outputs maintenance data acquired from the maintenance database 135 to the maintenance worker, or outputs maintenance data which is input by the maintenance worker to the maintenance database 135. The maintenance management terminal 136 may be provided in the office 132.

The maintenance management portable device 137 is carried by the maintenance worker, and can perform wireless communication with the maintenance management terminal 136. Maintenance inspection results obtained through inspection work and visual inspection performed by the maintenance worker are input to the maintenance management portable device 137 as maintenance data by the maintenance worker. The maintenance management portable device 137 outputs the input maintenance data to the maintenance management terminal 136 through wireless communication. In this case, the maintenance management terminal 136 and the maintenance management portable device 137 are provided in the building 133, and thus the wireless communication between the maintenance management terminal 136 and the maintenance management portable device 137 is performed in the building 133.

In the nuclear power plant system 100, the respective systems 101, 102, 103 and 104 and the plant operation historian database 105 are connected to each other via the buses 107, 108a, 108b and 108c, and thus various pieces of data obtained by the respective systems 101, 102, 103 and 104 can be shared, and the shared various pieces of data can be processed.

In the nuclear power plant system 100, a large information terminal 141 is provided in a conference room 134 of the office 132, and the large information terminal 141 is connected to the unit bus 108b. The large information terminal 141 can display not only the maintenance data accumulated in the plant maintenance system 104 but also the data acquired in the respective systems 101, 102 and 103.

Figure 2:
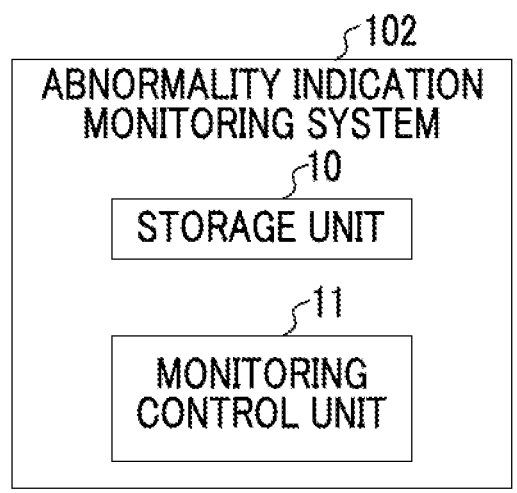
FIG. 2 is a schematic configuration diagram illustrating the plant abnormality predict detection system according to the present embodiment.
Figure 3:
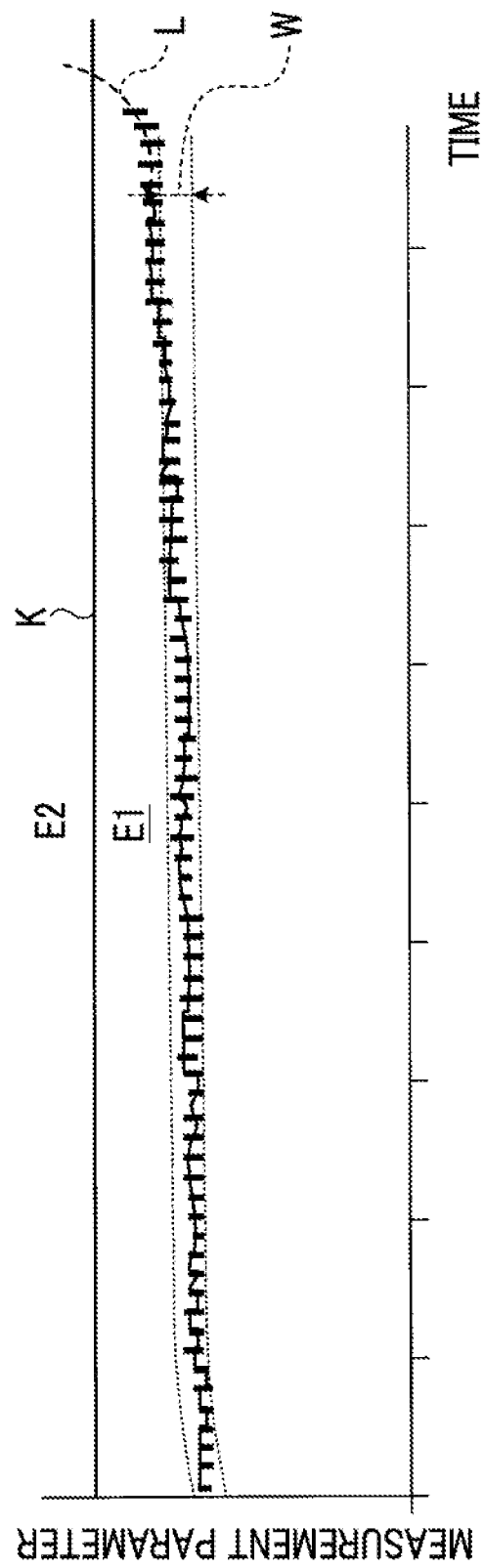
FIG. 3 is a diagram for explaining an instrument parameter.

Next, with reference to FIGS. 2 and 3, the plant abnormality predict detection system 102 will be described. FIG. 2 is a schematic configuration diagram illustrating the plant abnormality predict detection system according to the present embodiment. FIG. 3 is a diagram for explaining an instrument parameter.

The plant abnormality predict detection system 102 is formed by using a hardware resource such as a computer including a data storage unit 10 and a monitoring control unit 11. As described above, a normal range W which is a range in which plant operation data transitions normally on the basis of the past plant operation data preserved in the plant operation historian database 105 is set in the plant abnormality predict detection system 102. The plant abnormality predict detection system 102 determines whether or not the present plant operation data acquired in real time transitions in the normal range W.

The data storage unit 10 is formed by using hardware resources such as a memory and a storage device, and stores data including the past plant operation data acquired from the plant operation historian database 105 and the present plant operation data acquired in real time from the distributed control system 121. The data storage unit 10 stores the normal range W described below created by the monitoring control unit 11, and an alarm threshold K described below for a warning of abnormality in the nuclear power generation plant 110.

The monitoring control unit 11 is formed by using hardware resources such as an integrated circuit including a CPU, and monitors the presence or absence of an abnormality predict of the nuclear power generation plant 110 performing a base-load operation, or monitors the presence or absence of abnormality in the nuclear power generation plant 110.

The monitoring control unit 11 monitors the presence or absence of abnormality by using the alarm threshold K stored in the data storage unit 10 as a threshold value. In other words, the monitoring control unit 11 determines whether or not a predetermined instrument parameter included in the present plant operation data acquired in real time from the distributed control system 121 exceeds the alarm threshold K. For example, in a case where the alarm threshold K is an upper limit value, a region having a value which is equal to or smaller than the alarm threshold K is a normality determination range E1 in which an instrument parameter is normal, and a region having a value greater than the alarm threshold K is an abnormality determination range E2 in which an instrument parameter is abnormal. The monitoring control unit 11 determines that an instrument parameter is normal in a case where the instrument parameter has a value of the normality determination range E1, and determines that an instrument parameter is abnormal in a case where the instrument parameter has a value of the abnormality determination range E2.

In order to monitor the presence or absence of an abnormality predict, the monitoring control unit 11 creates the normal range W in an operation cycle from operation starting to operation stopping of the nuclear power generation plant 110 on the basis of the past plant operation data. The monitoring control unit 11 determines whether or not a predetermined instrument parameter included in the present plant operation data acquired in real time from the distributed control system 121 transitions in the normal range W. The normal range W is set to be included in the normality determination range E1.

Specifically, a description will be made of a case of creating the normal range W set for a predetermined instrument parameter included in plant operation data. In a case of creating the normal range W, the monitoring control unit 11 acquires the past plant operation data in each operation cycle. The monitoring control unit 11 acquires a value of a predetermined instrument parameter of the past plant operation data in a predetermined period of the operation cycle, and calculates an average value of the instrument parameter in the predetermined period. The monitoring control unit 11 calculates a standard deviation σ with the average value μ as a reference. The monitoring control unit 11 sets a range (that is, $μ±3σ$) in which the standard deviation σ is ±3σ centering on the average value μ, as the normal range W. The normal range W may be $μ±5σ$, and is set as appropriate depending on each instrument parameter. The monitoring control unit 11 performs the above-described process in all periods of the operation cycle so as to set the normal range W illustrated in FIG. 3 throughout all of the periods of the operation cycle. The normal range W is created by the monitoring control unit 11 before starting an operation of the nuclear power generation plant 110.

If the normal range W is set, the monitoring control unit 11 determines whether or not a predetermined instrument parameter included in the present plant operation data acquired in real time from the distributed control system 121 transitions in the normal range W. In a case where the instrument parameter exceeds the normal range W, the monitoring control unit 11 determines that an abnormality predict is detected. If the abnormality predict is detected, the monitoring control unit 11 notifies the maintenance worker of detection of the abnormality predict, and also outputs plant abnormality symptom indication data regarding the instrument parameter for which the abnormality predict is detected, to the abnormality diagnosis system 103. The abnormality diagnosis system 103 generates a prediction model L obtained by predicting the development of the instrument parameter according to an extrapolation method with respect to the instrument parameter of the plant abnormality symptom indication data, and performs diagnosis by using the generated prediction model L.

Next, a description will be made of the normal range W to be set. The normal range W is prepared in a plurality according to operation situations of the nuclear power generation plant 110. Specifically, a plurality of operation modes are prepared in the plant abnormality predict detection system 102 according to operation situations of the nuclear power generation plant 110. The plurality of operation modes include, for example, a test operation mode in which the nuclear power generation plant 110 performs a periodic test, an auxiliary machine switching mode in which switching to an auxiliary machine provided in the nuclear power generation plant 110 occurs, an activation operation mode in which the nuclear power generation plant 110 performs an activation operation, and an operation stopping mode in which the nuclear power generation plant 110 stops an operation thereof. The plurality of operation modes also include a mode in which the nuclear power generation plant 110 performs an operation in predetermined season (the summer season, the winter season, or the like). A plurality of normal ranges W are prepared to correspond to the plurality of operation modes. In a case where the normal range W corresponding to each operation mode is created, the normal range W is created on the basis of the past plant operation data in a predetermined period of the nuclear power generation plant 110 which is being operated under an operation situation corresponding to each operation mode.

If a predetermined operation mode is selected from among the plurality of operation modes, the monitoring control unit 11 sets the normal range W corresponding to the selected operation mode, and monitors an abnormality predict.

The monitoring control unit 11 may change a width of the normal range W to be set according to each instrument parameter or operation time. For example, the monitoring control unit 11 changes a width of the normal range W to be reduced stepwise or consecutively from the early period to the late period of the operation cycle of the nuclear power generation plant 110. Specifically, the normal range W is changed from $μ±5σ$ to $μ±3σ$ from the early period to the late period of the operation cycle. Thus, the monitoring control unit 11 has higher sensitivity of an abnormality predict in the late period of the operation cycle than in the early period. The set normal range W can be changed for each instrument parameter, but may be collectively changed for the plant operation data, that is, for all instrument parameters, and is not particularly limited.

As mentioned above, according to the present embodiment, the monitoring control unit 11 sets the normal range W on the basis of the past plant operation data by using the fact that the nuclear power generation plant 110 performs a base-load operation, and can appropriately detect an abnormality predict by determining whether or not the present instrument parameter exceeds the normal range W. In this case, since the monitoring control unit 11 has only to determine whether or not the present instrument parameter exceeds the normal range W without being required to obtain a correlation between instrument parameters, it is possible to prevent an increase in a computation load.

According to the present embodiment, since the normal range W can be set in the normality determination range E1, it is possible to detect an abnormality predict of the nuclear power generation plant 110 in the normality determination range E1 in which an instrument parameter is not abnormal.

According to the present embodiment, it is possible to set the appropriate normal range W according to an operation situation of the nuclear power generation plant 110. Therefore, it is possible to appropriately detect an abnormality predict corresponding to an operation situation of the nuclear power generation plant 110.

According to the present embodiment, since a width of the set normal range W can be changed, for example, the sensitivity of detection of an abnormality predict can be lowered by increasing the width of the normal range W, and the sensitivity of detection of an abnormality predict can be heightened by reducing the width of the normal range W.

REFERENCE SIGNS LIST

10 DATA STORAGE UNIT
11 MONITORING CONTROL UNIT
100 NUCLEAR POWER PLANT SYSTEM:
101 OPERATION MONITORING SYSTEM
102 PLANT ABNORMALITY: PREDICT DETECTION SYSTEM
103 ABNORMALITY DIAGNOSIS SYSTEM
104 PLANT MAINTENANCE SYSTEM
105 PLANT OPERATION HISTORIAN DATABASE
107 STATION BUS
108a, 108b, AND 108c UNIT BUS
110 NUCLEAR POWER GENERATION PLANT
115 SITE
121 DISTRIBUTED CONTROL SYSTEM
122 PROCESS CONTROL COMPUTER SYSTEM
123 GATEWAY
124 GATEWAY
131 MAIN CONTROL ROOM
132 OFFICE
133 BUILDING
134 CONFERENCE ROOM
135 MAINTENANCE DATABASE
136 MAINTENANCE MANAGEMENT TERMINAL
137 MAINTENANCE MANAGEMENT PORTABLE DEVICE
141 LARGE INFORMATION TERMINAL
W NORMAL RANGE
K ALARM THRESHOLD
E1 NORMALITY DETERMINATION RANGE
E2 ABNORMALITY DETERMINATION RANGE

The invention claimed is:

1. A plant abnormality prediction detection system for detectably monitoring an abnormality prediction in a nuclear power plant, comprising:
    a data storage unit configured to store plant operation data including an instrument parameter measured in the nuclear power plant and an alarm threshold for a warning of abnormality in the nuclear power plant; and
    a monitoring control unit configured to detect an abnormality prediction in the nuclear power plant on the basis of the plant operation data,
    wherein the nuclear power plant performs a base-load operation so that the instrument parameter has a predefined target value, and
    wherein the monitoring control unit is further configured to set a region having a value which is equal to or smaller than the alarm threshold as a normality determination range in which the instrument parameter is normal and a region having a value greater than the alarm threshold as an abnormality determination range in which the instrument parameter is abnormal, and set, in the normality determination range, a normal range which is a range for a transition of the instrument parameter in an operation cycle from operation starting to operation stopping of the nuclear power plant based on the past plant operation data to store the normal range in the data storage unit in advance, and configured to detect an abnormality prediction in a case where the instrument parameter at the current time exceeds the set normal range.

2. The plant abnormality prediction detection system according to claim 1,
    wherein an alarm threshold for a warning of abnormality in the nuclear power plant is set in advance,
    wherein the alarm threshold is a threshold value for dividing a region of the instrument parameter into a normality determination range in which the instrument parameter is normal and an abnormality determination range in which the instrument parameter is abnormal, and
    wherein the normal range is set in the normality determination range.

3. The plant abnormality prediction detection system according to claim 1,
    wherein a plurality of operation modes corresponding to operation situations of the nuclear power plant are prepared in advance,
    wherein the normal range is prepared in a plurality on the basis of the plant operation data in the past operation situations corresponding to the plurality of operation modes, and
    wherein, if the operation mode corresponding to the present operation situation of the nuclear power plant is set, the monitoring control unit is further configured to set the normal range corresponding to the operation mode.

4. The plant abnormality prediction detection system according to claim 1,
    wherein the monitoring control unit is further configured to change a width of the set normal range.

* * * * *